US006088173A

United States Patent [19]

Mendelsohn et al.

[11] Patent Number: 6,088,173

[45] Date of Patent: Jul. 11, 2000

[54] ADJUSTABLE MAGNIFIER STRUCTURE MOUNTABLE ON VARIOUS LAMP STANDS

[76] Inventors: Fred M. Mendelsohn, 1214 W. Cass St., Tampa, Fla. 33606; Simon A. H. Lee, 316 Chungli City, Taoyuan Hsien, Taiwan

[21] Appl. No.: 09/401,639

[22] Filed: Sep. 22, 1999

[51] Int. Cl.[7] .............................. G02B 27/02; G02B 7/02

[52] U.S. Cl. ............................................ 359/802; 359/818

[58] Field of Search .................................... 359/801, 802, 359/803, 805, 806, 809, 813, 818, 819, 822; 362/396

[56] References Cited

U.S. PATENT DOCUMENTS

| | | | |
|---|---|---|---|
| 354,976 | 12/1886 | Field | 248/484 |
| 4,885,667 | 12/1989 | Seldon | 362/253 |
| 5,847,883 | 12/1998 | Rispoli, Sr. | 359/801 |

*Primary Examiner*—Ricky Mack
*Attorney, Agent, or Firm*—A. W. Fisher, III

[57] ABSTRACT

An adjustable magnifier structure mountable on various lamp stands, being comprised of a magnifier, an adjustable post, an extensible rod and a clamping portion, wherein, the extensible rod is provided on the two ends thereof with the magnifier and the extensible rod respectively. The magnifier can be rotated to any desired angular position, and the extensible rod can be adjusted in displacement freely, hence the adjustable post can be adjusted to any position in a three-dimensional space freely. The clamping portion is connectable with any of various lamp posts, so that the accompanied practical effect of various lamps can be increased by mounting a magnifier on any of them. The structure of the present invention is novel, convenient and practical in being mountable on these lamp stands without holding of a magnifier by a user.

2 Claims, 6 Drawing Sheets

4

3

2

5

1

ADJUSTABLE MAGNIFIER STRUCTURE MOUNTABLE ON VARIOUS LAMP STANDS

BACKGROUND OF THE INVENTION

1. Field of the Invention

The present invention is related to an adjustable magnifier structure mountable on various lamp stands. It combines usage of a magnifier and a lamp stand, and thereby the adjustable magnifier structure mountable on various lamp stands is designed to provide a suitable position of the lamp together with the magnifier for the eyes of a user. Thereby, the user needs not to take the magnifier with his hand. This is especially suitable to be applied in the cases where a magnifier is required to check fine articles or for an operation, to thereby increase the accompanied practical effect of an illuminating lamp.

2. Description of the Prior Art

Conventional desk lamps or various lamps in the markets are used by people to do reading or operation, and some repairers of electronic products or artists who have inferior sight have to use magnifiers to help reading, writing, repairing or carving. However, magnifiers should be held with hands, while the magnifiers, the lamps and the eyes are difficult to get their ideal relative positions. Thus inconvenience in use results. In studying the reason of this, it is found that the cases requiring holding of magnifiers are mainly the operations for higher delicacy with both hands of workers. In holding a magnifier with a hand, the work can only be operated with another hand. And inconvenience is induced, for it is hard to take care simultaneously the magnifier, the lamp and the eyes. These three are difficult to get their ideal relative position.

SUMMARY OF THE INVENTION

The primary object of the present invention is to provide an adjustable magnifier structure mountable on various lamp stands to get rid of the trouble of having one hand held a magnifier, in order that the accompanied practical effect of various lamps can be increased by mounting magnifiers thereon.

To obtain the object of the present invention in practice, an extensible rod can be provided on the two ends thereof with a magnifier and an adjustable post respectively. The adjustable post is provided on one end thereof with a clamping portion to form a holding part for a magnifier.

The magnifier is adapted to random rotating and stretching as well as retracting to get a three dimensional displacement. The clamping portion is capable of connecting with various lamp posts to render the structure of the present invention mountable on various lamp stands without holding of a magnifier by a user, and to render the positions of sight, illuminating lamp and the magnifier adjustable to a best relative allocation. Thus the accompanied practical effect of the lamps mounting magnifiers thereon can be increased.

The present invention will be apparent after reading the detailed description of the preferred embodiment thereof in reference to the accompanying drawings.

DETAILED DESCRIPTION OF THE PREFERRED EMBODIMENT

Figure 1:
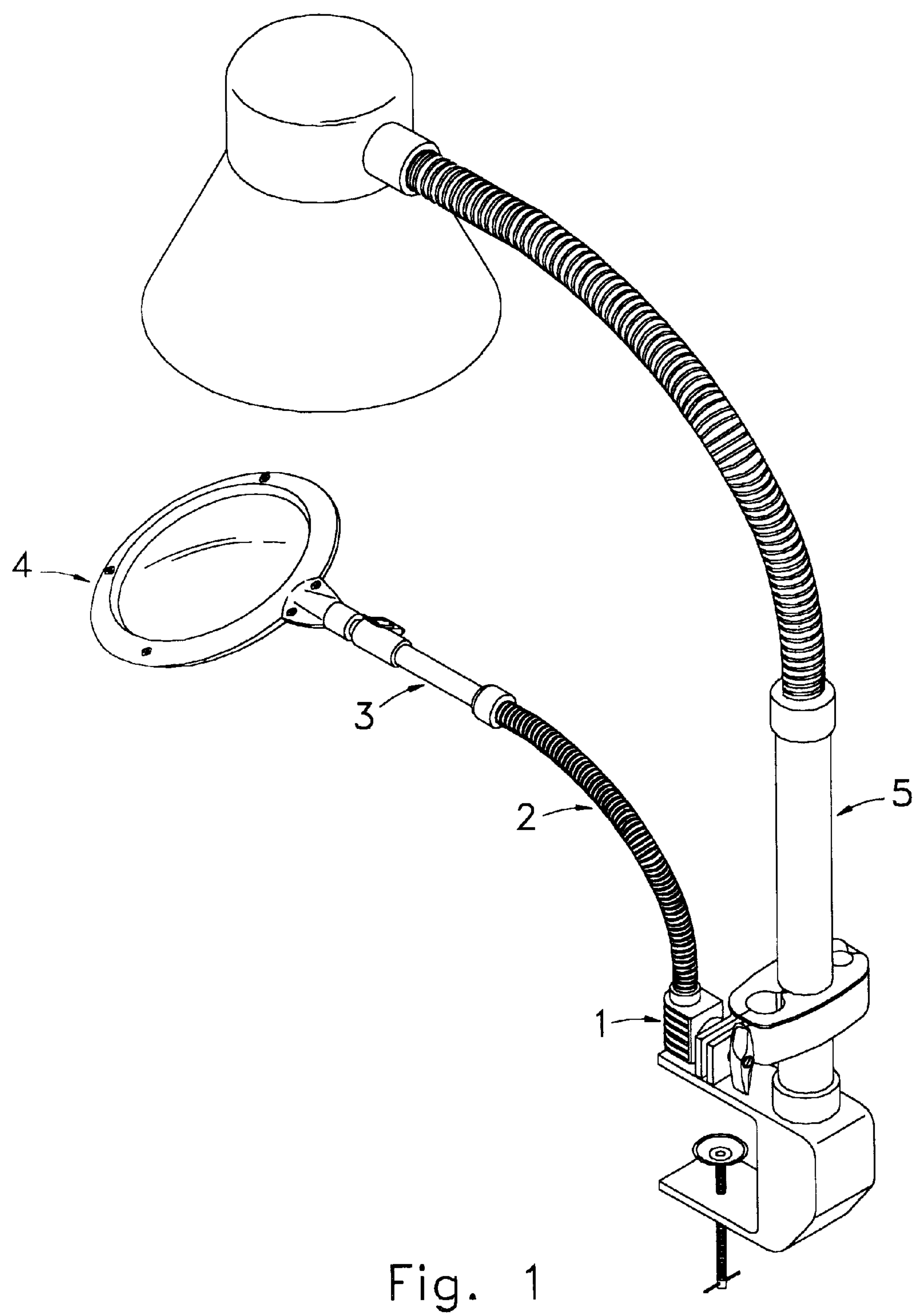
FIG. 1 is a perspective view of the present invention.
Figure 2:
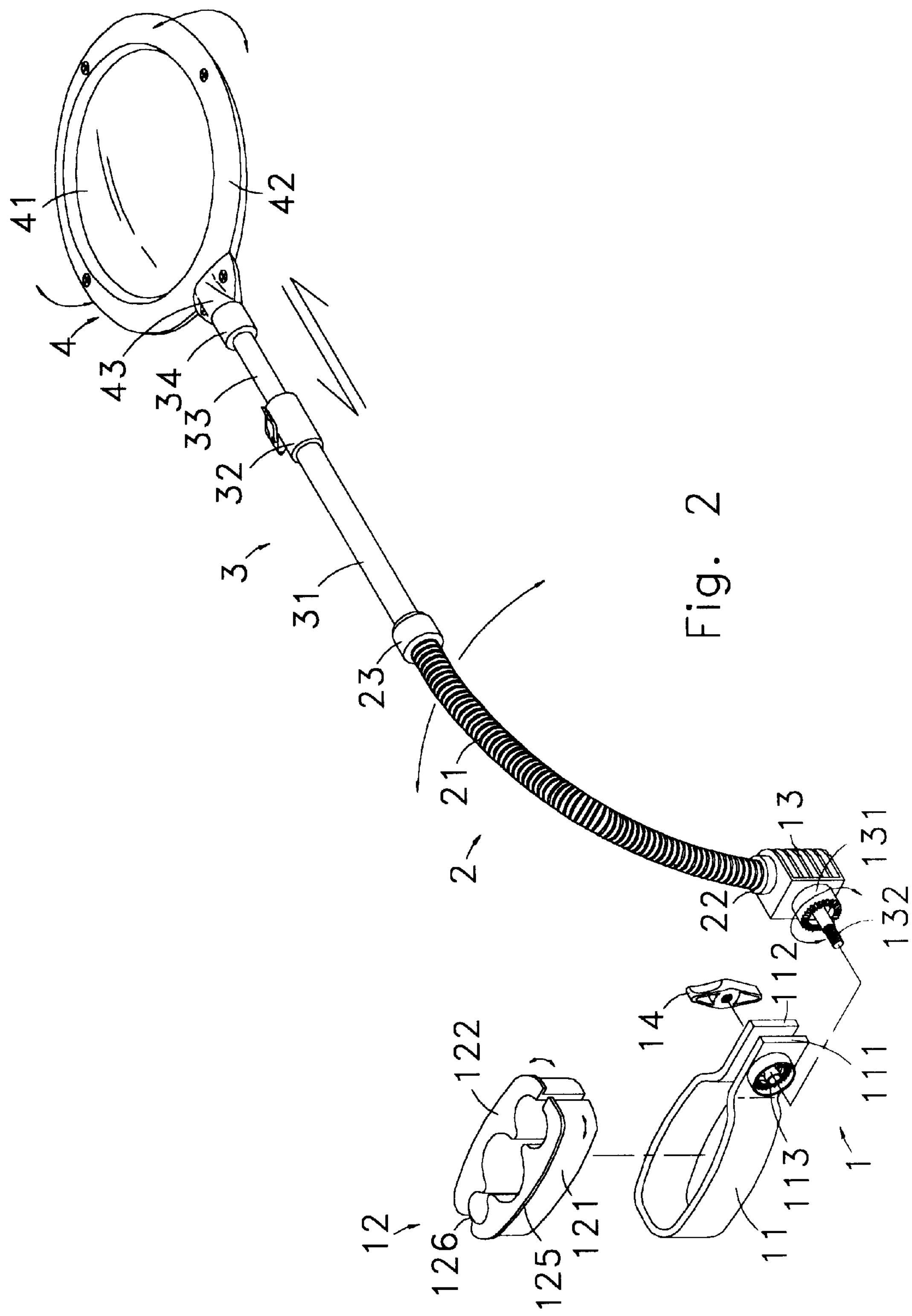
FIG. 2 is an analytic perspective view of the present invention.

Referring to FIGS. 1 and 2, the "adjustable magnifier structure mountable on various lamp stands" of the present invention is comprised mainly of a clamping portion 1, an adjustable post 2, an extensible rod 3 and a magnifier 4.

Wherein, the magnifier 4 is composed of a lens 41 and a frame 42 having the corresponding shape with the periphery of the lens 41. The frame 42 is provided on one side thereof with a receiving seat 43 for rotationally slipping in a connector 34 of the extensible rod 3. Therefore, the magnifier 4 can be rotated for any angular angle.

The extensible rod 3 is comprised of a conduit 31, a locking member 32, a leading rod 33 and the connector 34. Wherein, the conduit 31 is provided on one end thereof with the locking member 32. The other end of the conduit 31 is screwed in and locked on a locking head 23 of the adjustable post 2. The leading rod 33 is provided on one end thereof with the connector 34 capable of slipping over the receiving seat 43 of the magnifier 4, while the other end thereof is extended through the locking member 32 and is received in the conduit 31. The leading rod 33 in the conduit 31 can be freely extended and retracted for displacement. By tightening of the locking member 32, the leading rod 33 can be extended and retracted for displacement to a desired position and is positioned there.

The adjustable post 2 is made from a flexible metallic pipe 21 slipped thereover with a hose. The flexible metallic pipe 21 is provided on one end thereof with the locking head 23 to rotationally lock the conduit 31 of the extensible rod 3. And is provided on the other end thereof with a connecting pipe 22 to be slipped in an insertion hole 133 on a socket 13 of the clamping portion 1 (also referring to FIG. 3). The magnifier 4 can be displaced freely in a three-dimensional space to any desired position by the three-dimensional bending capability of the flexible metallic pipe 21.

Figure 3:
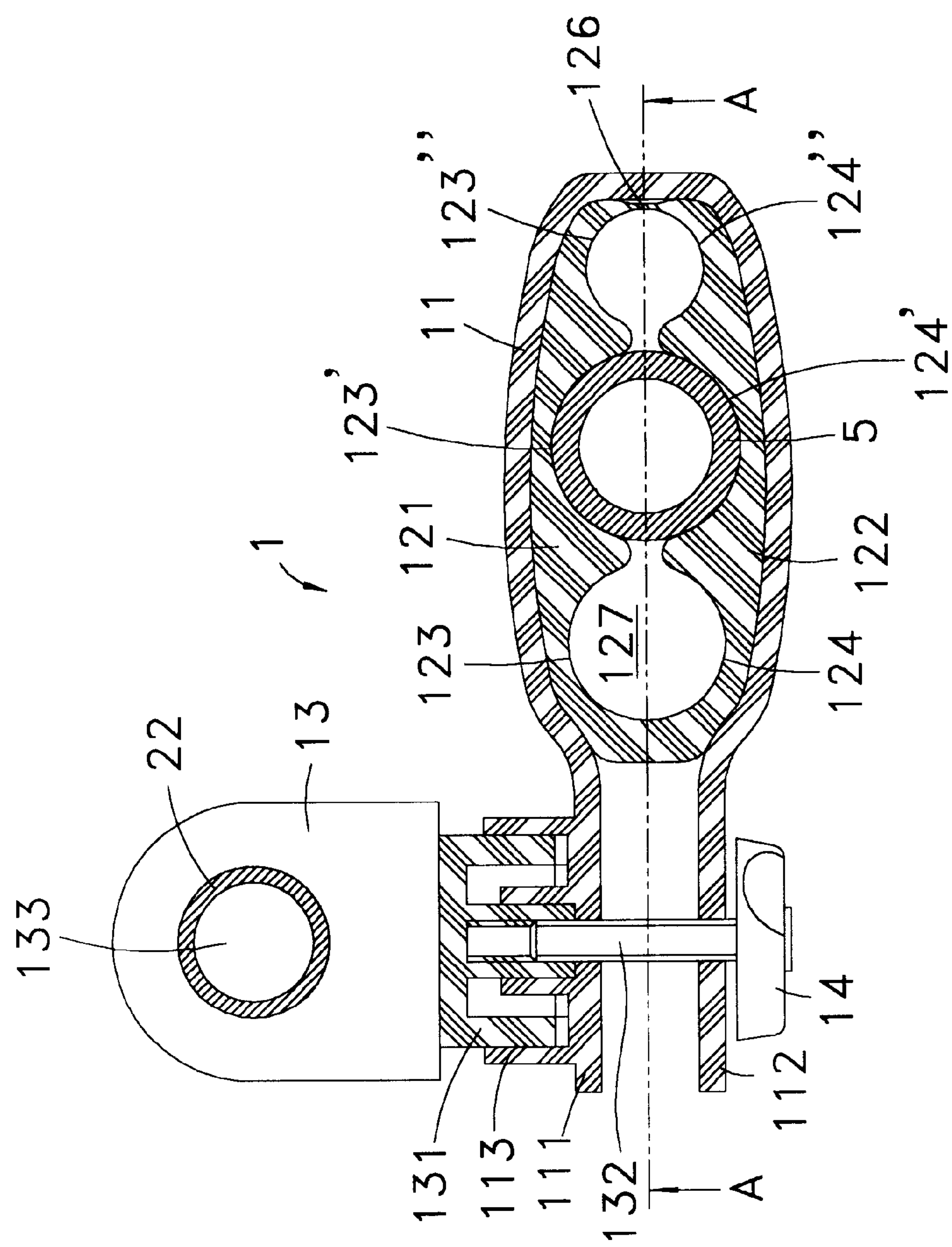
FIG. 3 is a top view showing a clamping portion of the present invention.
Figure 4:
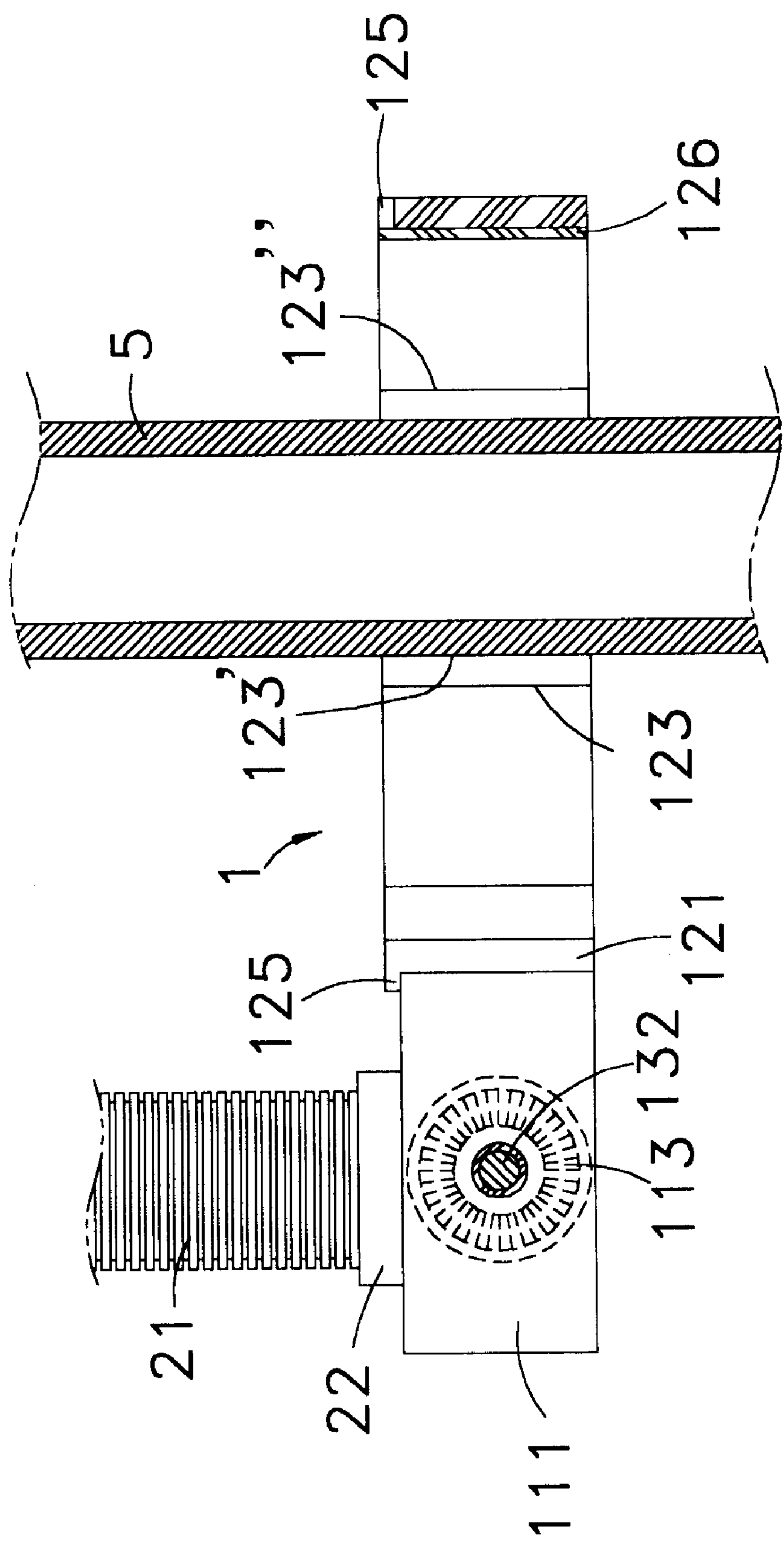
FIG. 4 is a sectional view showing the clamping portion of the present invention.

The clamping portion 1 is comprised of a clamping annulus 11, a clamping block 12, the socket 13 and a nut 14 (also referring to FIG. 3). Wherein, the clamping annulus 11 is in the shape of "C", the inner peripheral wall thereof is in the shape corresponding to the external wall of a flat style lamp post 6. At the opening of the "C" shaped clamping annulus 11 are two connecting ends 111, 112. One of them, i.e., the connecting end 112, is provided with a hole, while the other connecting end 111 is provided with an internal annular gear 113 having its teeth arranged in a radiant shape. The clamping block 12 has two symmetrically arrayed but mutually connected half-blocks 121 and 122, and is provided on the inner walls thereof with a plurality of semi-circular grooves 123, 123', 123" and 124, 124', 124". The semi-circular grooves 123, 123', 123" and 124, 124', 124" are in the shapes corresponding to the external peripheral walls of common pipe-like lamp posts 5 of various sizes to be clamped therebetween and form clamping spaces 127 available of fixedly clamping the pipe-like lamp posts. The external peripheral wall of the clamping block 12 corresponds in shape to the internal peripheral wall of the clamping annulus 11 and is provided with a peripheral top flange 125 (also referring to FIGS. 2 and 4). The two symmetrically arrayed half-blocks 121 and 122 are connected with a connecting film 126 therebetween, and can be slipped in the clamping annulus 11 in an accurate orientation by aid of the top flange 125. The socket 13 is provided with the above mentioned insertion hole 133 for slipping therein the connecting pipe 22 of the adjustable post 2. One end of the socket 13 is provided with a bolt 132 around which a crown gear 131 having its teeth arranged in a radiant shape is provided. The bolt 132 of the socket 13 is extended through a hole in the internal annular gear 113 to rotationally lock the nut 14 through the hole provided on the connecting end 112. So that the crown gear 131 engages the internal annular gear 113, by this, the angular orientation of the socket 13 can be adjusted and fixed and the connecting pipe 22 can be slipped in the insertion hole 133 for free rotation. Thereby, the magnifier 4 can be freely displaced in a three-dimensional space.

The magnifier 4 is locked on the extensible rod 3, while the extensible rod 3 is locked on the adjustable post 2 which is in turn slipped in the clamping portion 1. In this way, the holding structure of the lens is formed; the magnifier can thus be adjusted to be located at any desired position in a three-dimensional space freely. When the holding structure of the magnifier is assembled, selection of a clamping annulus 11 for the clamping portion 1 and the size of a clamping space 127 of the clamping block 12 between a pair of semi-circular grooves 123,124; 123', 124'; or 123", 124" are done in pursuance of a common pipe-like lamp post 5 selected (also referring to FIGS. 3 and 4). By locking of the nut 14 onto the socket 13 to tighten the clamping annulus 11, the clamping space 127 of the clamping block 12 is contracted tightly on the pipe-like lamp post 5 to complete assembling of the pipe-like lamp post 5 with the holding structure of the magnifier.

Figure 5:
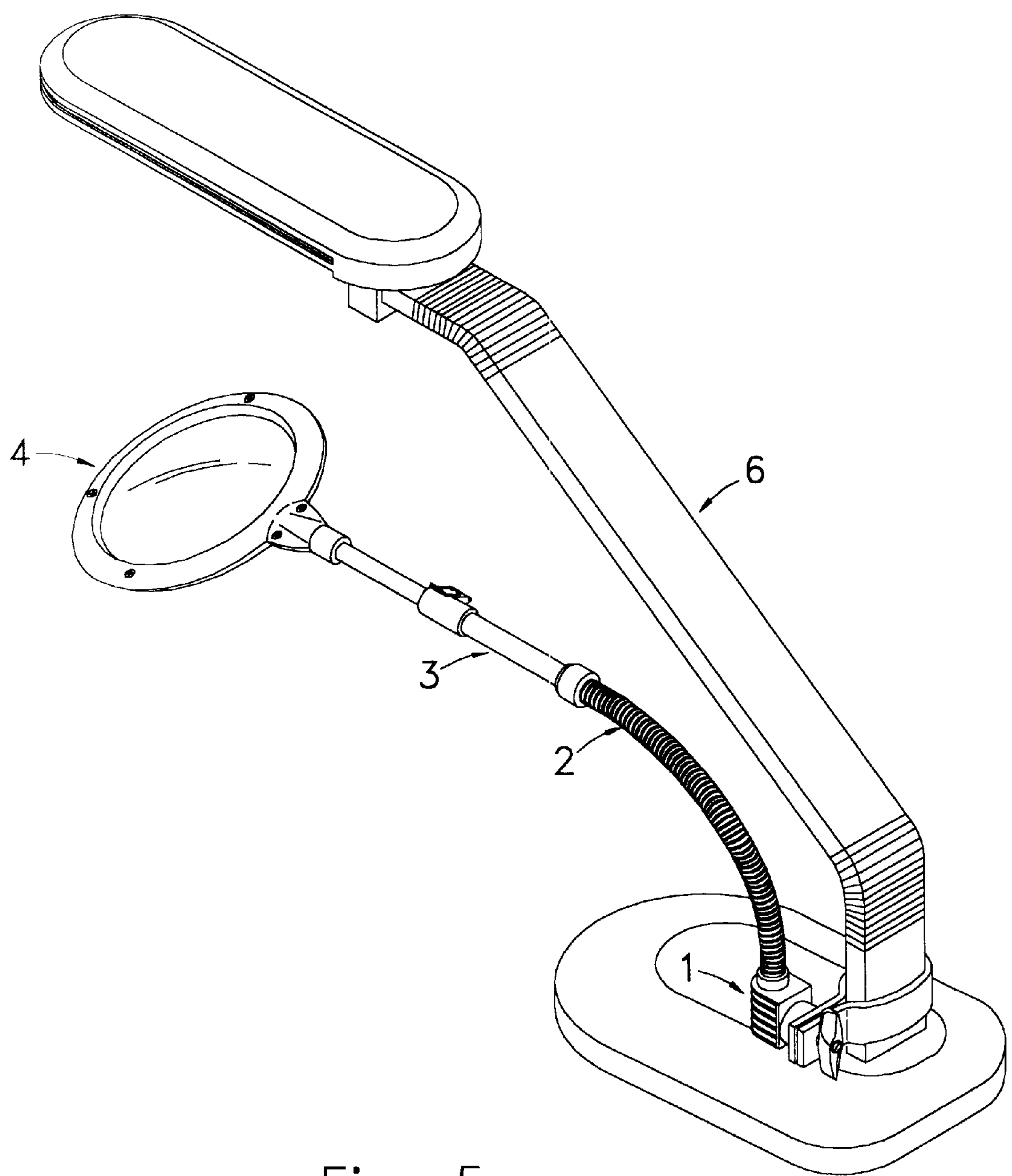
FIG. 5 is a perspective view showing another embodiment of the present invention.
Figure 6:
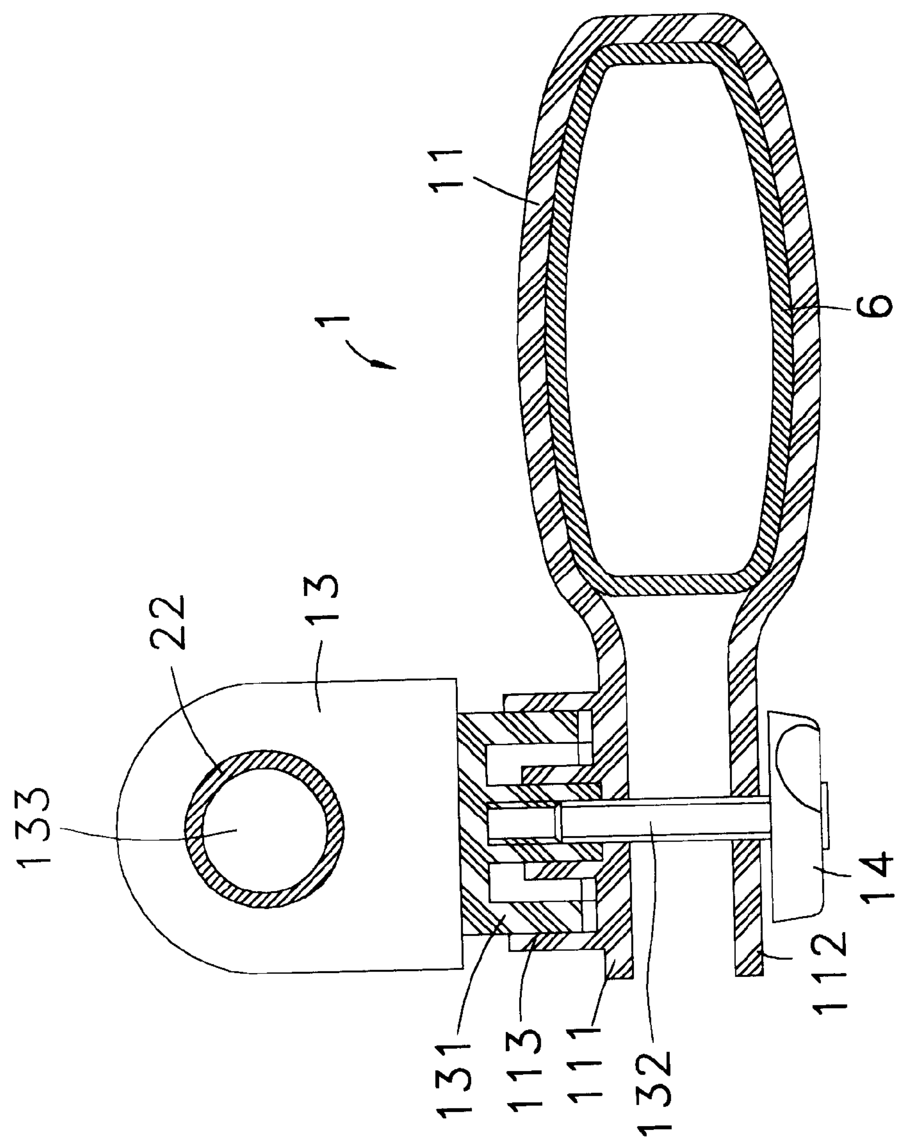
FIG. 6 is a sectional view showing the another embodiment of the present invention.

When a flat style lamp post 6 is to be assembled with the holding structure of the magnifier (also referring to FIG. 5), the clamping annulus 11 for the clamping portion 1 can be separated from the clamping block 12 and is used alone. By virtue that the internal peripheral wall of the "C" shaped clamping annulus 11 is in the shape corresponding to the external wall of a flat style lamp post 6, the clamping annulus 11 is singly and tightly clamped onto the flat style lamp post 6 with the nut 14 rotationally locking on the socket 13 (also referring to FIG. 6). In this way, the holding structure of the magnifier can also be assembled with the flat style lamp post 6.

When the clamping annulus 11 and the clamping block 12 are to be assembled with various lamp posts, the shapes of the internal peripheral wall of clamping annulus 11 and the semi-circular grooves 123, 123', 123" and 124, 124', 124" of the clamping block 12 can correspond to the external peripheral walls of the pipe-like lamp posts of various sizes. In this way, the holding structure of the magnifier can be assembled with any of various lamp posts at one's will for desired usage.

Having thus described my invention, what I claim as new and desire to be secured by Letters Patent of the united states are:

1. An adjustable magnifier structure mountable on various lamp stands, being comprised of a magnifier, an adjustable post, an extensible rod and a clamping portion, wherein, said clamping portion is comprised of a "C" shaped clamping annulus and a clamping block, said clamping annulus is adapted to use alone;

said extensible rod is provided on the two ends thereof with said magnifier and said adjustable post, said adjustable post is slipped in said clamping portion, by selecting a clamping annulus and a clamping block to slip over said adjustable post, a magnifier is adapted to rotating to any desired angular position, and said extensible rod is adapted to adjusting of displacement freely, hence said adjustable post is adapted to adjusting to any position in a three-dimensional space freely, said clamping portion is connectable with various lamp posts; said adjustable magnifier structure is characterized by that:

the inner peripheral wall of said clamping annulus is in the shape corresponding to the external wall of a flat style lamp post, at the opening of said clamping annulus are two connecting ends, one of them is provided with a hole, while the other connecting end is provided with an internal annular gear adapted to engaging with a crown gear;

said clamping block has two symmetrically arrayed but mutually connected half-blocks, and is provided on the inner walls thereof with a plurality of semi-circular grooves which are in the shapes corresponding to the external peripheral walls of common pipe-like lamp posts of various sizes to be clamped therebetween and form clamping spaces available of fixedly clamping said pipe-like lamp posts, the external peripheral wall of said clamping block corresponds in shape to the internal peripheral wall of said clamping annulus.

2. An adjustable magnifier structure mountable on various lamp stands as claimed in claim 1, wherein, the shape of said internal peripheral wall of clamping annulus corresponds to any external peripheral wall of a plurality of said pipe-like lamp posts of various sizes.

* * * * *